US006907484B2

(12) United States Patent
Dwyer, III

(10) Patent No.: US 6,907,484 B2
(45) Date of Patent: Jun. 14, 2005

(54) METHOD AND APPARATUS FOR ATOMICALLY CHANGING SELECTED BITS WITHIN A REGISTER

(75) Inventor: Thomas J. Dwyer, III, Sunnyvale, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 361 days.

(21) Appl. No.: 10/253,790

(22) Filed: Sep. 24, 2002

(65) Prior Publication Data

US 2004/0059853 A1 Mar. 25, 2004

(51) Int. Cl.[7] .......................... G06F 9/00; G06F 12/00
(52) U.S. Cl. ..................................... 710/200; 713/100
(58) Field of Search ............................ 710/200, 104, 710/33; 709/236, 250; 712/36, 219, 220; 713/100; 361/683; 365/189.01

(56) References Cited

U.S. PATENT DOCUMENTS

| | | | | | |
|---|---|---|---|---|---|
| 4,019,033 A | * | 4/1977 | Parmet | ...................... | 714/805 |
| 4,261,035 A | * | 4/1981 | Raymond | ................... | 709/236 |
| 4,839,642 A | * | 6/1989 | Batz et al. | ............... | 340/10.31 |
| 5,625,580 A | * | 4/1997 | Read et al. | ................... | 703/21 |
| 6,738,892 B1 | * | 5/2004 | Coon et al. | ................... | 712/24 |

OTHER PUBLICATIONS

"A core generator for fully synthesizable and highly parameterizable RISC–cores for system–on–chip designs" by Berekovic, M.; Heistermann, D.; Pirsch, P. (abstract only) Publication Date: Oct. 8–10, 1998.*

* cited by examiner

*Primary Examiner*—Gopal C. Ray
(74) *Attorney, Agent, or Firm*—Park, Vaughan & Fleming LLP

(57) ABSTRACT

One embodiment of the present invention provides a system that facilitates atomically updating selected bits within a register in a computing system. During operation, the system receives a command to update selected bits within the register. This command includes a data word and a control bit pattern. Next, the system examines the control bit pattern to determine an operation to be performed on the register. The system then performs the operation, which involves using the dataword to modify a content of the register atomically, without blocking subsequent commands to update the register.

24 Claims, 3 Drawing Sheets

METHOD AND APPARATUS FOR ATOMICALLY CHANGING SELECTED BITS WITHIN A REGISTER

BACKGROUND

1. Field of the Invention

The present invention relates to the design of registers within computer systems. More specifically, the present invention relates to a method and an apparatus for atomically changing selected bits within a register without changing other bits in the register.

2. Related Art

Modern computing systems provide status registers that allow the computer system to update and maintain the status of various subunits and components within the computing system. One or more bits within a status registers typically contain state information for an associated component in the computer system. Moreover, a single register can include bits for multiple unrelated components within the computer system. During operation, a processor within the computing system can read a status register and examine certain bits to determine the state of a specific component.

A processor can also change bits within a status register by first reading the status register, changing the desired bits, and writing the result back to the register. However, changing bits in this way can be a problem in systems that support multiple threads of execution. After a first thread has read the register, a second thread can possibly write to the register before the first thread is able to write the changed bits to the register. In this case, the subsequent write by the first thread overwrites the changes made by the second thread.

In order to ensure against this potential problem, the register can be protected by a mutual exclusion variable (mutex) or semaphore. To modify a register that is protected by a mutex variable, a process must first gain control of the mutex variable. Next, the process reads the register, modifies the desired bits and writes the modified dataword back to the register. The process then releases the mutex to allow other processes to access the register. By protecting the register in this way, one thread is forced to complete its update before allowing another thread to start an update. This effectively makes the read-modify-write process atomic or uninterruptible.

While using a mutex ensures correctness for the register operations, using the mutex requires additional time to set and clear the mutex. Moreover, the mutex can cause contention problems because other processes may have to wait for the mutex to be released.

Hence, what is needed is a method and an apparatus for changing selected bits within a register without the performance problems described above.

SUMMARY

One embodiment of the present invention provides a system that facilitates atomically updating selected bits within a register in a computing system. During operation, the system receives a command to update selected bits within the register. This command includes a data word and a control bit pattern. Next, the system examines the control bit pattern to determine an operation to be performed on the register. The system then performs the operation, which involves using the dataword to modify a content of the register atomically, without blocking subsequent commands to update the register.

In another embodiment, if the control bit pattern specifies an OR operation, performing the operation involves ORing the data word with the content of the register.

In another embodiment, if the control bit pattern specifies an AND operation, performing the operation involves ANDing a compliment of the data word with the content of the register.

In another embodiment, if the control bit pattern specifies a write operation, performing the operation involves overwriting the content of the register with the data word.

In another embodiment, the content of the register can be successively updated from different sources.

In another embodiment, performing the operation involves using circuitry adjacent to the register to perform the operation without having to move the content of the register across a bus.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Register

Figure 1:
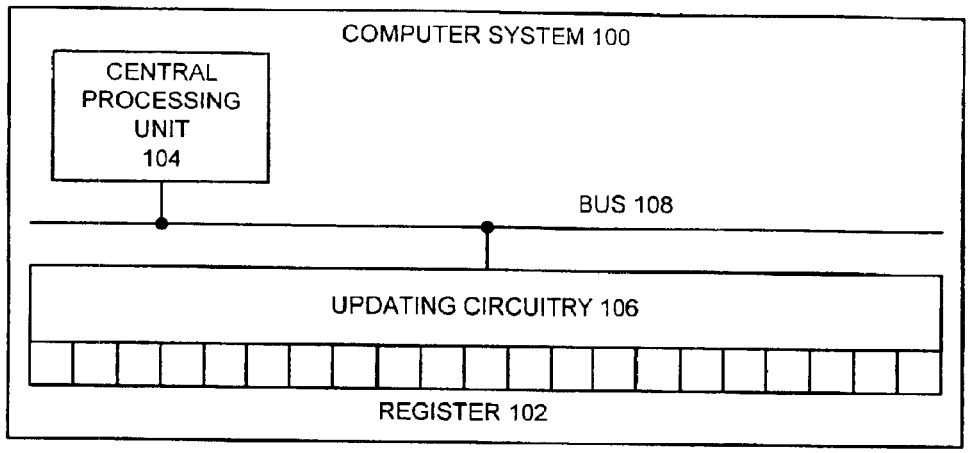
FIG. 1 illustrates a register 102 in accordance with an embodiment of the present invention.

FIG. 1 illustrates a register 102 within a computer system 100 in accordance with an embodiment of the present invention. Computer system 100 can include central processing unit 104, updating circuitry 106, and bus 108. Note that register 102 can be implemented within an application specific integrated circuit (ASIC) or within a computer processor. Register 102 includes a number of bits, wherein each bit contains state information for a particular device or subsystem within computer system 100. Central processing unit 104 performs the operations specified by the various threads within computer programs executing within computer system 100. Updating circuitry 106 receives instructions from central processing unit 104 across bus 108 to update the bits within register 102. During operation, threads can set and clear bits as required to update state information

within register 102 associated with various components within the computer system.

Write Command

Figure 2:
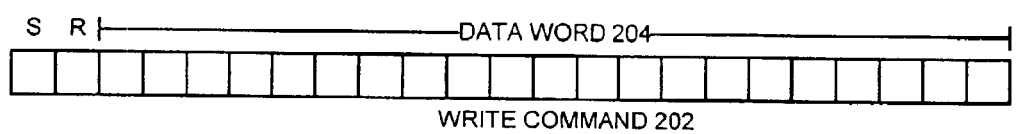
FIG. 2 illustrates a write command 202 in accordance with an embodiment of the present invention.

FIG. 2 illustrates the structure of a write command 202 in accordance with an embodiment of the present invention. Write command 202 includes dataword 204 and a pair of control bits, labeled S and R, which control the process of selectively setting and clearing bits within register 102. Note that dataword 204 is the same length as register 102 and includes a bit for each bit within register 102. During operation, a thread causes write command 202 to be written to register 102. The S and R bits within write command 202 specify an operation to be performed using dataword 204 during the write operation as described below in conjunction with FIGS. 3–6. In one embodiment of the present invention, control bits S and R are part of dataword 204, so that writing the control bits S and R to a register merely involves including additional bits in the dataword 204 to be written to the register.

Setting Selected Bits

Figure 3:
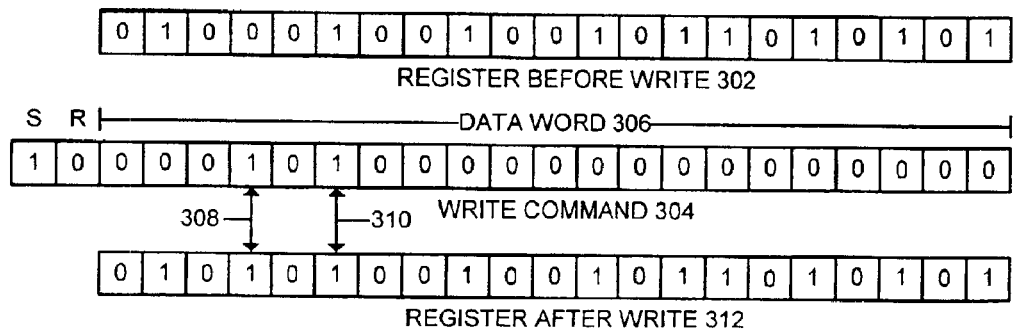
FIG. 3 illustrates the process of setting selected bits within a register in accordance with an embodiment of the present invention.

FIG. 3 illustrates the process of setting selected bits in register 102 in accordance with an embodiment of the present invention. As is illustrated in FIG. 3, register before write 302 includes a series of zero bits and one bits. Moreover, the S and R bits of write command 304 are set to one and zero, respectively, which in this example specifies an OR operation. However, note that in general any pattern of the S and R bits can specify an OR operation. Additionally, two bits, 308 and 310, within dataword 306 are set to one.

During the OR operation, bits within dataword 306 are ORed with corresponding bits in register before write 302 to produce register after write 312. Note that bits 308 and 310 within register after write 312 are both one, while the corresponding bits in register before write 302 are zero and one, respectively. Because dataword 306 contains ones in these bit positions, the OR operation sets both of the corresponding bits in register after write 312 to one regardless of their previous state. Because dataword 306 contains zeros in other bit positions, none of the other corresponding bits in register before write 302 are changed during the OR operation.

Clearing Selected Bits

Figure 4:
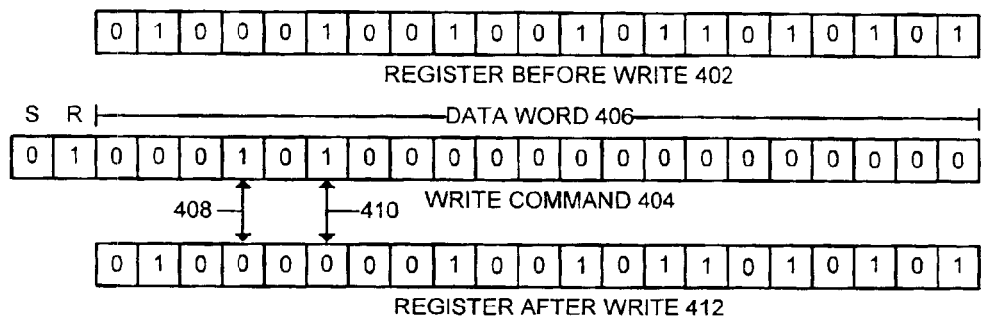
FIG. 4 illustrates the process of clearing selected bits within the register in accordance with an embodiment of the present invention.

FIG. 4 illustrates the process of clearing selected bits in register 102 in accordance with an embodiment of the present invention. As shown in FIG. 4, register before write 402 includes a series of zero and one bits. Moreover, the S and R bits of the write command are set to zero and one, respectively, which in this example specifies an AND operation. Additionally, two bits, 408 and 410, are set to one within dataword 406.

During the AND operation, bits within dataword 406 are ANDed with corresponding bits in register before write 402 to produce register after write 412. Note that bits 408 and 410 within register after write 412 are both zero, while in the corresponding bits in register before write 402 are set to zero and one respectively. Because dataword 406 contains ones in these bit positions, the AND operation with the complement of dataword 406 clears both of these bits, 408 and 410, to zero regardless of their previous state. Because dataword 406 contains zeros in other bit positions, none of the other corresponding bits in register before write 402 are changed during the AND operation.

Writing New Data

Figure 5:
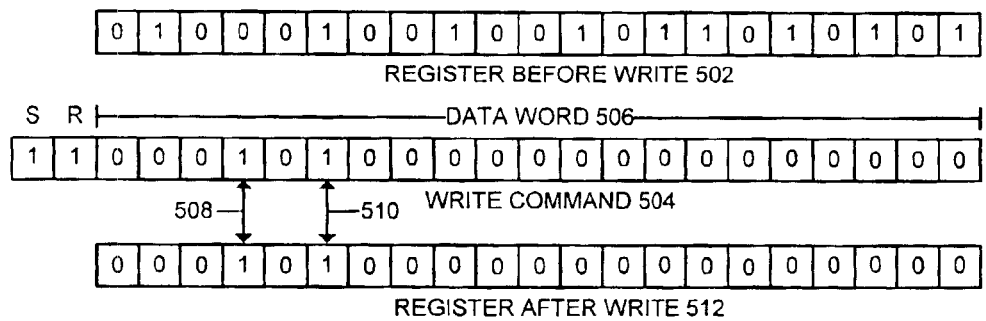
FIG. 5 illustrates the process of overwriting the register in accordance with an embodiment of the present invention.

FIG. 5 illustrates the process of writing new data to register 102 in accordance with an embodiment of the present invention. As shown in FIG. 5, register before write 502 includes a series of zero and one bits. Moreover, the S and R bits of write command 504 are both set to one, which in this example specifies a write operation. Also note that in this example, setting both S and R bits to zero also specifies a write operation. Additionally, two bits, 508 and 510, are set to one within dataword 506.

During the write operation, the bits within dataword 506 are written directly to register after write 512. Hence, the original state of the bits within register before write 502 is lost. As shown in FIG. 5, bits 508 and 510 within register after write 512 are both set to one and the remaining bits are set to zero.

Writing Bits to a Register

Figure 6:
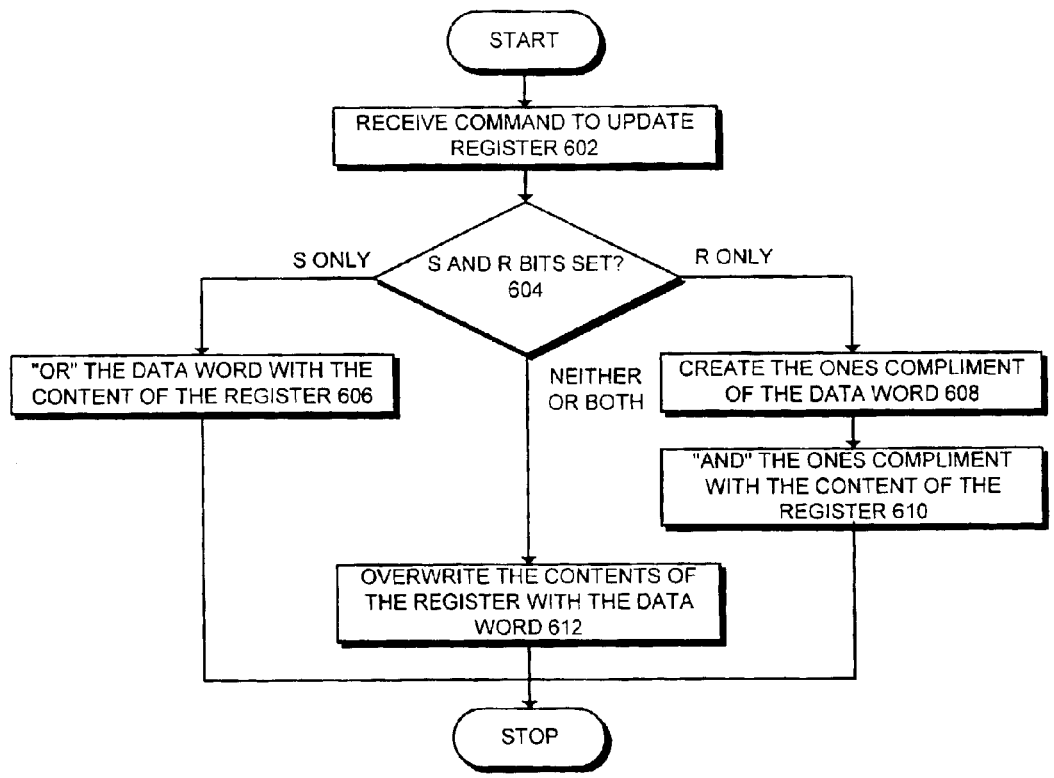
FIG. 6 is a flowchart illustrating the process of writing bits to a register in accordance with an embodiment of the present invention.

FIG. 6 is a flowchart illustrating the process of writing bits to a register 102 in accordance with an embodiment of the present invention. The system starts when a write command is received to update a register (step 602). Next, the system examines the S and R bits to determine which operation to perform (step 604). If only the S bit is set, the system ORs the dataword within the command with the content of register 102 to complete the operation (step 606).

If only the R bit is set, the system first creates the ones compliment of the dataword (step 608). Next, the system bitwise ANDs this ones compliment with the content of register 102, thereby completing the process (step 610).

If neither the S bit nor the R bit are set, or if they are both set, the system overwrites the content of register 102 with the dataword, thereby ending the process (step 612).

Updating Circuitry

Figure 7:
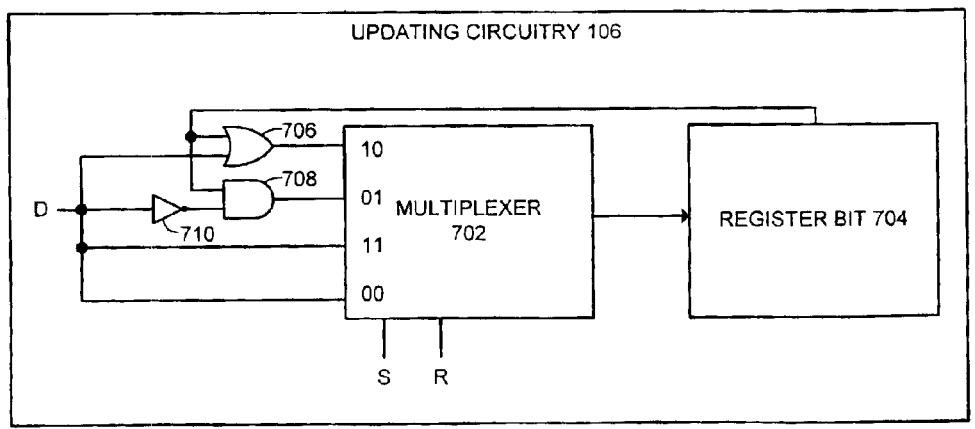
FIG. 7 illustrates updating circuitry 106 in accordance with an embodiment of the present invention.

FIG. 7 illustrates updating circuitry 106 in accordance with an embodiment of the present invention. Updating circuitry 106 includes multiplexer 702, register bit 704, OR gate 706, AND gate 708, and inverter 710. Register bit 704 is exemplary of a bit within register 102. The current state of register bit 704 is provided to OR gate 706 and to AND gate 708. OR gate 706 also receives the incoming data bit D and provides the OR of register bit 704 and D to the "10" input of multiplexor 702. Inverter 710 inverts the state (takes the ones complement of) incoming data bit D and provides the inverted bit to AND gate 708. The output of AND gate 708 is provided to the "01" input of multiplexer 702. Incoming data bit D is also supplied directly to the "11" and "00" inputs of multiplexer 702.

The incoming S and R bits of the write command are supplied to multiplexer 702 to select the desired input, which will be provided to register bit 704. For example, if S and R are "0" and "1", respectively, multiplexer 702 selects the output of AND gate 708 to be provided to register bit 704 for storage. Note that each bit within register 102 is updated using similar circuitry. Also note that other implementations of the logic within updating circuitry 106 are equally likely.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for atomically updating selected bits within a register, comprising:

receiving a command to update a content of the register, wherein the command includes a data word arid a control bit pattern;

examining the control bit pattern to determine an operation to be performed on the register; and performing the operation by using a data word to modify selected bits in the register atomically, without blocking subsequent commands to update the content of the register.

2. The method of claim 1, wherein if the control bit pattern specifies an OR operation, performing the operation involves ORing the data word with the content of the register.

3. The method of claim 1, wherein if the control bit pattern specifies an AND operation, performing the operation involves ANDing a compliment of the data word with the content of the register.

4. The method of claim 1, wherein if the control bit pattern specifies a write operation, performing the operation involves overwriting the content of the register the data word.

5. The method of claim 1, wherein the content of the register can be successively updated from different sources.

6. The method of claim 1 wherein performing the operation involves using circuitry adjacent to the register to perform the operation without having to move the content of the register across a bus.

7. An apparatus for atomically updating selected bits within a register, comprising:

a receiving mechanism configured to receive a command to update selected bits within the register, wherein the command includes a data word and a control bit pattern;

an examining mechanism configured to examine the control bit pattern to determine an operation to be performed; and an operation mechanism configured to use a data word to modify selected bits in the register atomically, without blocking subsequent commands to update the content of the register.

8. The apparatus of claim 7, wherein if the control bit pattern specifies an OR operation, the operation mechanism is configured to OR the data word with the content of the register.

9. The apparatus of claim 7, wherein if the control bit pattern specifies an AND operation, the operation mechanism is configured to AND a complement of the data word with the content of the register.

10. The apparatus of claim 7, wherein if the control bit pattern specifies a write operation, the operation mechanism is configured overwrite the content of the register with the data word.

11. The apparatus of claim 7, wherein the content of the register can be successively updated from different sources.

12. The apparatus of claim 7, wherein the operation mechanism uses circuitry adjacent to the register to perform the operation without having to move the content of the register across a bus.

13. A computer system including a mechanism for atomically updating selected bits within a register, comprising:

a processor;

the register within the processor;

a memory;

a receiving mechanism configured to receive a command to update selected bits within the register, wherein the command includes a data word and a control bit pattern;

an examining mechanism configured to examine the control bit pattern to determine an operation to be performed; and an operation mechanism configured to use a data word to modify selected bits in the register atomically, without blocking subsequent commands to update the content of the register.

14. The computer system of claim 13, wherein if the control bit pattern specifies an OR operation, the operation mechanism is configured to OR the data word with the content of the register.

15. The computer system of claim 13, wherein if the control bit pattern specifies an AND operation, the operation mechanism is configured to AND a complement of the data word with the content of the register.

16. The computer system of claim 13, wherein if the control bit pattern specifies a write operation, the operation mechanism is configured overwrite the content of the register with the data word.

17. The computer system of claim 13, wherein the content of the register can be successively updated from different sources.

18. The computer system of claim 13, wherein the operation mechanism uses circuitry adjacent to the register to perform the operation without having to move the content of the register across a bus.

19. An integrated circuit including a mechanism for atomically updating selected bits within a register, comprising: the register;

a receiving mechanism configured to receive a command to update selected bits within the register, wherein the command includes a data word and a control bit pattern;

an examining mechanism configured to examine the control bit pattern to determine an operation to be performed; and an operation mechanism configured to use a data word to modify selected bits in the register atomically, without blocking subsequent commands to update the content of the register.

20. The integrated circuit of claim 19, wherein if the control bit pattern specifies an OR operation, the operation mechanism is configured to OR the data word with the content of the register.

21. The integrated circuit of claim 19, wherein if the control bit pattern specifies an AND operation, the operation mechanism is configured to AND a complement of the data word with the content of the register.

22. The integrated circuit of claim 19, wherein if the control bit pattern specifies a write operation, the operation mechanism is configured overwrite the content of the register with the data word.

23. The integrated circuit of claim 19, wherein the content of the register can be successively updated from different sources.

24. The integrated circuit of claim 19, wherein the operation mechanism uses circuitry adjacent to the register to perform the operation without having to move the content of the register across a bus.

* * * * *

UNITED STATES PATENT AND TRADEMARK OFFICE
CERTIFICATE OF CORRECTION

PATENT NO.     : 6,907,484 B2
DATED          : June 14, 2005
INVENTOR(S)    : Thomas J. Dwyer, III It is certified that error appears in the above-identified patent and that said Letters Patent is hereby corrected as shown below:

Column 4,
Line 64, please delete the word "arid" and replace with the word -- and --.

Signed and Sealed this

Sixteenth Day of August, 2005

JON W. DUDAS
*Director of the United States Patent and Trademark Office*